(12) United States Patent
Unno

(10) Patent No.: US 7,914,871 B2
(45) Date of Patent: Mar. 29, 2011

(54) COMPOSITION FOR FRICTION MATERIAL AND FRICTION MATERIAL USING SAME

(75) Inventor: Mitsuo Unno, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 329 days.

(21) Appl. No.: 12/160,466

(22) PCT Filed: Jan. 12, 2007

(86) PCT No.: PCT/JP2007/050338
§ 371 (c)(1), (2), (4) Date: Jul. 10, 2008

(87) PCT Pub. No.: WO2007/080975
PCT Pub. Date: Jul. 19, 2007

(65) Prior Publication Data
US 2010/0233464 A1      Sep. 16, 2010

(30) Foreign Application Priority Data

Jan. 13, 2006   (JP) ................. P2006-005939

(51) Int. Cl.
*B32B 3/02* (2006.01)

(52) U.S. Cl. ...... 428/66.2; 106/36; 523/149; 188/251 A; 192/107 M

(58) Field of Classification Search ............. 428/66.2; 192/107 M; 106/38.22, 36; 523/149; 188/251 A
See application file for complete search history.

(56) References Cited

U.S. PATENT DOCUMENTS 4,622,070 A * 11/1986 Sakurai et al. ............ 106/38.22
2007/0140929 A1 * 6/2007 Watanabe et al. ............ 422/179

FOREIGN PATENT DOCUMENTS

| JP | 57-187349 | 11/1982 |
| JP | 07-102080 | 4/1995 |
| JP | 2879364 | 1/1999 |
| JP | 2001-072961 | 3/2001 |
| JP | 2003-301878 | * 10/2003 |

* cited by examiner

*Primary Examiner* — N. Edwards
(74) *Attorney, Agent, or Firm* — Antonelli, Terry, Stout & Kraus, LLP.

(57) ABSTRACT

The present invention relates to a composition for a friction material that is suitable for the production of friction materials such as disc brake pads or brake linings used for braking automobiles or the like, and also relates to a friction material that uses the composition. The composition for a friction material according to the present invention comprises a fibrous substrate, a binder and a filler, wherein the fibrous substrate comprises at least two types of biosoluble ceramic fibers having different fiber lengths.

13 Claims, No Drawings

COMPOSITION FOR FRICTION MATERIAL AND FRICTION MATERIAL USING SAME

TECHNICAL FIELD

The present invention relates to a composition for a friction material that is suitable for the production of friction materials such as disc brake pads or brake linings used for braking automobiles or the like, and also relates to a friction material that uses the composition.

BACKGROUND ART

Friction materials such as disc brake pads and brake linings are used for braking automobiles and the like. These friction materials perform their braking role by rubbing against an opposing material such as a disc rotor or brake drum, and therefore require a high coefficient of friction and favorable stability of that coefficient of friction.

The friction material is produced by mold processing of a composition comprising a fibrous substrate, a binder and a filler and the like. The fibrous substrate forms the basic matrix of the friction material, and is the component that imparts the friction material with its braking properties.

Conventionally, asbestos was used as the fibrous substrate in friction materials, but since the identification of asbestos as being a substance injurious to humans, various national laws have lead to the production of replacement materials.

Examples of fibrous substrates that have been proposed as substitutes for asbestos include friction materials comprising a plurality of fibers, including inorganic fibers, metal fibers and organic fibers and the like (for example, see Japanese Patent Laid-Open No. 2001-072961).

Of these potential substitute materials, ceramic fibers are known to offer excellent improvement in the strength of the friction material. These ceramic fibers are synthetic inorganic fibers having a heat resistance of not less than 1000° C., and specific examples include silica fibers, alumina fibers, alumina-silica fibers, and alumina-silica-zirconia fibers.

However, the reasons that asbestos is hazardous to humans include a very fine fiber diameter, and the fact that the asbestos fibers do not dissolve in vivo, but are rather retained inside the body. Accordingly, among the potential substitute materials, there is considerable concern that inorganic fibers with a fine fiber diameter and a large aspect ratio, and fibers that do not dissolve in vivo may have the same injurious effects on humans as asbestos. For this reason, friction materials have been proposed that use a biosoluble ceramic fiber as the friction material ceramic fiber (for example, see Japanese Patent Laid-Open No. 2003-301878).

However, when compared with friction materials that use a bioinsoluble ceramic fiber, friction materials that use a biosoluble ceramic fiber suffer from inferior derusting properties, and undergo considerable abrasion upon derusting of the opposing material.

DISCLOSURE OF INVENTION

An object of the present invention is to provide a friction material composition that can be used in a friction material that has no adverse effects on humans and exhibits superior derusting performance, and also to provide a friction material that uses this composition.

The present invention, which achieves this object, relates to a composition for a friction material that comprises a fibrous substrate that contains no fibers such as asbestos or bioinsoluble ceramic fibers that have adverse effects on humans, a binder, and a filler, wherein the fibrous substrate comprises at least two types of biosoluble ceramic fibers having different fiber lengths.

In one aspect, the present invention relates to a composition for a friction material in which the fibrous substrate comprises a biosoluble ceramic fiber shorter than 200 μm, and a biosoluble ceramic fiber longer than 400 μm.

In another aspect, the present invention relates to a composition for a friction material comprising from 1 to 3% by weight of a biodegradability ceramic fiber having a fiber length of at least 400 μm, and from 4 to 10% by weight of a biosoluble ceramic fiber having a fiber length of 50 to 200 μm.

In yet another aspect, the present invention relates to a composition for a friction material comprising at least 0.2% by weight of a shot with a particle diameter of at least 45 μm.

In yet another aspect, the present invention relates to a composition for a friction material, wherein the biosoluble ceramic fiber having a fiber length of 50 to 200 μm comprises an alumina component.

Furthermore, the present invention also relates to a friction material that is produced by hot press molding using the composition for a friction material described above.

This Application is related to the subject matter disclosed in prior Japanese Application 2006-005939 filed on Jan. 13, 2006; the entire content of which is incorporated by reference herein.

BEST MODE FOR CARRYING OUT THE INVENTION

A more detailed description of the friction material composition of the present invention is presented below.

The composition for a friction material according to the present invention comprises a fibrous substrate that excludes asbestos and bioinsoluble ceramic fibers, a binder, and a filler, wherein the fibrous substrate comprises biosoluble ceramic fibers, and these biosoluble ceramic fibers include at least two types of biosoluble ceramic fibers having different fiber lengths. By using these biosoluble ceramic fibers of different fiber lengths, the friction material composition can be uniformly dispersed and supported, the reinforcing effect of the friction material using the composition can be improved, and excellent derusting properties can be achieved with the opposing material. Using a biosoluble ceramic fiber that is shorter than 200 μm and a biosoluble ceramic fiber that is longer than 400 μm as the two or more biosoluble ceramic fibers of different fiber lengths is particularly preferred in terms of the derusting properties.

The fibrous substrate used in the composition for a friction material according to the present invention may be formed solely from biosoluble ceramic fibers with the properties described above, or may be formed from a combination of the above biosoluble ceramic fibers, and one or more other fibers such as inorganic fibers, organic fibers or metal fibers typically used in friction materials. However, the composition for a friction material according to the present invention contains no asbestos inorganic fibers or bioinsoluble ceramic fibers. In this description, the expression "bioinsoluble ceramic fibers" refers to ceramic fibers that do not dissolve in vivo, and in which the chemical composition of the fibers is such that the combined quantity of alkali oxides and alkaline earth oxides (namely, the combined quantity of the oxides of sodium, potassium, calcium, magnesium and barium) is less than 18%. Examples of such bioinsoluble fibers include $SiO_2$ fibers, $Al_2O_3$ fibers, $Al_2O_3$—$SiO_2$ fibers, and $Al_2O_3$—$SiO_2$—$ZrO_2$ fibers.

The biosoluble ceramic fibers used in the fibrous substrate of the composition for a friction material according to the present invention are ceramic fibers which, even if ingested internally, break down and are excreted from the body within a short period of time, have a chemical composition in which the combined quantity of alkali oxides and alkaline earth oxides (namely, the combined quantity of the oxides of sodium, potassium, calcium, magnesium and barium) is at least 18%, and also satisfy a weighted half life of less than 10 days for fibers of not more than 20 µm in a short-term biopersistence test by inhalation; or a weighted half life of less than 40 days for fibers longer than 20 µm in a short-term biopersistence test by intratracheal instillation; no evidence of excess carcinogenicity in an appropriate intra-peritoneal test; or an absence of relevant pathogenicity or neoplastic changes in a suitable long term inhalation test (Nota Q of the EU Directive 97/69/EC (exclusions to carcinogen classification)). Specific examples of these types of biosoluble ceramic fibers include $SiO_2$—CaO—MgO fibers and $SiO_2$—CaO—MgO—$Al_2O_3$ fibers. In the present invention, from the viewpoints of the heat resistance and reinforcing effect achieved, $SiO_2$—CaO—MgO—$Al_2O_3$ fibers comprising alumina are preferred.

Furthermore, these biosoluble ceramic fiber are produced by using a typical melt-spinning method to convert the ceramic to a fibrous form.

In the present invention, by combining at least two types of these biosoluble ceramic fibers having different fiber lengths, a combination of favorable dispersibility of the fibers and a favorable reinforcing effect can be achieved, and abrasion of the friction material during rust removal can be reduced, enabling a friction material with superior derusting properties to be obtained. An example of the combination of fibers is a combination of a biosoluble ceramic fiber having a fiber length shorter than 300 µm (hereafter also referred to as a "short ceramic fiber" or simply a "short fiber"), and a biosoluble ceramic fiber having a fiber length longer than 300 µm (hereafter also referred to as a "long ceramic fiber" or simply a "long fiber"), and the difference in fiber length between the combined biosoluble ceramic fibers is preferably approximately 200 µm or greater. Furthermore, when a short ceramic fiber and a long ceramic fiber are used in combination, both the short ceramic fiber and the long ceramic fiber may each employ either a single type of fiber, or a mixture of two or more different types of fiber.

In this description, the values quoted for the "fiber length" and the "fiber diameter" all refer to average values for the fiber concerned. For example, a fiber having a fiber length of 200 µm means that when the fiber length is measured for 50 individual fibers under an optical microscope, the average value of the measured lengths is 200 µm.

However, the production process for ceramic fibers typically results in the generation of shot (particulate material) comprising material that has not formed as fibers, and this shot is incorporated within the ceramic fibers. When a ceramic fiber is used, a larger quantity of shot within the friction material composition improves the rust removal properties of the friction material, and improves the derusting properties of the opposing material.

The composition for a friction material according to the present invention includes compositions comprising at least 0.2% by weight of shot within the composition, and preferably comprises from 0.2 to 3.0% by weight of shot. If the quantity of shot exceeds 3.0% by weight, then abrasion of the opposing material increases, and the sound vibration performance tends to deteriorate, resulting in problems such as judder caused by uneven abrasion of the rotor.

As described above, shot describes material that is generated during the production process for the ceramic fiber and incorporated within the ceramic fiber. In the composition for a friction material according to the present invention, examples of methods of incorporating shot within the composition include utilizing the shot incorporated within the ceramic fiber, and adding shot that has been isolated from a ceramic fiber. On the other hand, biosoluble ceramic fibers that contain no shot may also be used, and compositions that use spherical particles of an oxide similar to a shot component, instead of the shot, may also be used.

Furthermore, in a particularly preferred embodiment of the composition for a friction material according to the present invention, using a long biosoluble ceramic fiber with a fiber length of 400 to 700 µm and a short biosoluble ceramic fiber with a fiber length of 50 to 200 µm as the aforementioned biosoluble ceramic fibers is preferred in terms of the reinforcing effect that manifests as a result of the dispersibility of the fibers, and the derusting properties. By using short and long biosoluble ceramic fibers having fiber lengths within the above ranges, the friction material composition of the present invention can be dispersed and supported more uniformly. The long ceramic fiber and the short ceramic fiber may use either ceramic fibers having the same composition and fiber diameter, or ceramic fibers of different composition or fiber diameter.

As follows is a description of the two types of biosoluble ceramic fibers used in the composition for a friction material according to the present invention, namely the long fiber and the short fiber, but the present invention may also include biosoluble ceramic fibers other than these fibers, and is not restricted to the two types of fiber described below.

The long ceramic fiber used in the friction material composition of the present invention can use fibers such as the commercial product Super wool SW607MAX-D (manufactured by Shinnikka Thermal Ceramics Corporation, composition: $SiO_2$:MgO: CaO=66:19:15). Furthermore, in terms of the reinforcing effect obtained, the long ceramic fiber preferably has a fiber diameter of not more than 8 µm.

Furthermore, the quantity of the long ceramic fiber is preferably within a range from 1 to 3% by weight, and even more preferably from 1 to 2% by weight, of the friction material composition. If this quantity is less than 1% by weight, then when a friction material is formed, a satisfactory reinforcing effect is not obtained, and the material tends to be prone to abrasion and suffer from inferior derusting properties. Furthermore, if the quantity exceeds 3% by weight, then the dispersibility of the fiber within the friction material tends to deteriorate.

From the viewpoints of the reinforcing effect and derusting properties achieved, the short ceramic fiber used in the friction material composition of the present invention preferably comprises alumina. The quantity of alumina is preferably within a range from 1 to 3% by weight of the short ceramic fiber. Specific examples of fibers that can be used as this type of short ceramic fiber include the product Fineflex-E Bulk Fiber T (manufactured by Nichias Corporation) (composition: $SiO_2$:MgO+CaO:$Al_2O_3$=75 to 80:19 to 25:1 to 3). Furthermore, in terms of the reinforcing effect obtained, the short ceramic fiber preferably has a fiber diameter of not more than 8 µm.

Furthermore, the quantity of the short ceramic fiber is preferably within a range from 4 to 10% by weight, and even more preferably from 2 to 6% by weight, of the friction material composition. If this quantity is less than 4% by weight, then the friction material tends to be unable to generate a satisfactory reinforcing effect, and also tends to be prone to abrasion and suffer from inferior derusting properties. Furthermore, if the quantity exceeds 10% by weight, then the dispersibility of the fiber within the friction material tends to deteriorate.

Examples of inorganic fibers that can function as the fibrous substrate within the friction material composition of the present invention, other than the aforementioned biosoluble ceramic fibers, include rock wool, potassium titanate fiber, glass fiber, and wollastonite, although from the viewpoint of reducing materials that have an impact on the environment, potassium titanate and glass fiber are preferably avoided. Furthermore, examples of organic fibers that can function as the fibrous substrate within the friction material composition of the present invention, other than the aforementioned biosoluble ceramic fibers, include aramid fiber, carbon fiber, polyimide fiber, cellulose fiber, acrylic fiber, and phenolic resin fiber.

Moreover, examples of metal fibers that can function as the fibrous substrate within the friction material composition of the present invention, other than the aforementioned biosoluble ceramic fibers, include fibers of copper, brass, bronze, aluminum and steel, although in terms of attacking properties on the opposing material and noise properties, copper, brass or bronze fiber is preferred. Steel is heavy, prone to rusting, causes a deterioration in the noise properties, and is more likely to damage and abrade the opposing material, and therefore from a practical perspective, if used in the present invention, is preferably used in a very small quantity.

The aforementioned fibrous substrate incorporated within the composition for a friction material according to the present invention may be either in a fibrous form or a powder form, and the quantity of the substrate preferably represents from 5 to 50% by weight, and even more preferably from 10 to 30% by weight, of the friction material composition of the present invention. Of this substrate, the total quantity of biosoluble ceramic fibers used in the present invention preferably represents from 5 to 30% by weight, and even more preferably from 5 to 10% by weight, of the friction material composition of the present invention. Furthermore, during preparation of the composition for a friction material according to the present invention, the fibrous substrate incorporated within the friction material composition can be blended directly with the other materials that constitute the friction material composition.

The binder incorporated within the composition for a friction material according to the present invention can use the types of thermosetting resins typically used in friction materials. Specific examples of these thermosetting resins include phenolic resins, and various modified phenolic resins such as acrylic-modified phenolic resins, silicone-modified phenolic resins, cashew-modified phenolic resins, epoxy-modified phenolic resins, and alkylbenzene-modified phenolic resins. Of these, phenolic resins, acrylic-modified phenolic resins and silicone-modified phenolic resins are preferred, and these resins may be used either alone, or in combinations of two or more different resins.

The filler incorporated within the composition for a friction material according to the present invention may use an organic filler or an inorganic filler. Examples of organic fillers include cashew dust, tire rubber dust, acrylic rubber dust, isoprene rubber, NBR and SBR, which may be used either alone, or in combinations of two or more different materials. The quantity of the organic filler preferably represents from 2 to 20% by weight, and even more preferably from 5 to 10% by weight, of the friction material composition.

Furthermore, examples of inorganic fillers include antimony trisulfide, tin sulfide, molybdenum disulfide, iron sulfide, bismuth sulfide, zinc sulfide, boron nitride, magnesium oxide, calcium hydroxide, calcium oxide, sodium carbonate, calcium carbonate, magnesium carbonate, barium sulfate, coke, graphite, mica, iron oxide, vermiculite, potassium titanate, calcium sulfate, zirconium oxide, zircon sand, alumina, potassium titanate platelets, diatomaceous earth, talc, clay, mullite and zeolite, which may be used either alone, or in combinations of two or more different materials. The quantity of the inorganic filler is preferably represents from 30 to 80% by weight, and even more preferably from 50 to 70% by weight, of the friction material composition.

By using a composition for a friction material according to the present invention, a friction material can be provided that has no adverse effects on humans and exhibits superior derusting properties for the opposing material.

The composition for a friction material according to the present invention can be prepared by blending the fibrous substrate, the binder and the filler described above, and then mixing the resulting blended formulation using a mixer such as a Redige mixer or Eirich mixer. Furthermore, the friction material composition of the present invention may also include other materials besides those described above according to need, and for example, may include metal powders such as copper powder, zinc powder or brass powder.

The composition for a friction material according to the present invention can be used as a friction material such as a disc brake pad or a brake lining within an automobile or the like, or can also be used as a friction material for a clutch facing, an electromagnetic brake or a holding brake or the like, by subjecting the friction material composition to one or more steps such as molding, processing or bonding. Furthermore, with the friction material composition of the present invention, even if, during production of the friction material or during subsequent use of the friction material, the friction material composition flies up and is ingested by a person, the biosoluble ceramic fiber having a large aspect ratio dissolves in-vivo and is excreted from the body, meaning it has no adverse effects on the body. Moreover, in those cases where the composition for a friction material according to the present invention is used as a friction material, when rust is removed from the opposing material during braking of the automobile or the like in which the friction material has been installed, abrasion of the friction material by the abrasive rust powder generated by the rust removal is minimal, indicating excellent derusting properties.

The friction material of the present invention is produced using the friction material composition of the present invention, and exhibits excellent derusting properties relative to the opposing material.

Furthermore, the friction material of the present invention can be used for a disc pad, brake lining, clutch facing, electromagnetic brake or holding brake or the like for an automobile or the like.

The friction material of the present invention can be produced using a typical method, and for example, can be produced by hot press molding of the composition for a friction material according to the present invention. More specifically, the friction material composition of the present invention is mixed uniformly using a mixer such as a Redige mixer or pressurized kneader or the like, the resulting mixture is pre-molded using a mold, the thus obtained preform is then molded for 2 to 10 minutes under conditions including a molding temperature of 130 to 160° C. and a molding pressure of 20 to 50 MPa, and the resulting molded product is then subjected to a heat treatment at 150 to 250° C. for a period of 2 to 10 hours. If required, the product may also be subjected to a coating treatment, scorching treatment, or grinding treatment.

By using the friction material composition of the present invention, the friction material of the present invention can be imparted with an improved reinforcing effect, as well as excellent resistance to abrasion and excellent derusting properties during rust removal from the opposing material (Example 1 to 6).

EXAMPLES

As follows is a more detailed description of the composition for a friction material according to the present invention, based on a series of examples.
(Preparation of Disc Brake Pads)
Using compositions for forming friction materials according to the present invention, friction materials in the form of disc brake pads were prepared.

Example 1

A friction material composition was prepared by blending together 1.4% by weight relative to the total weight of the friction material composition of a biosoluble ceramic fiber (B) having an average fiber length of 625 μm as the long fiber (product name: SW607MAX-D, manufactured by Shinnikka Thermal Ceramics Corporation, containing no alumina component, quantity of shot with a particle size of at least 45 μm: 17% by weight of the long ceramic fiber), 5.9% by weight relative to the total weight of the friction material composition of a biosoluble ceramic fiber (E) having an average fiber length of 100 μm as the short fiber (product name: Fineflex-E Bulk Fiber T, manufactured by Nichias Corporation, quantity of alumina component: 2% by weight of the short ceramic fiber, quantity of shot with a particle size of at least 45 μm: 9% by weight of the short ceramic fiber), and the materials shown in Table 2 (quantities within the friction material composition: long ceramic fiber: 1.4% by weight, short ceramic fiber: 5.9% by weight, shot with a particle size of at least 45 μm: 0.8% by weight).

This friction material composition was mixed using a Redige mixer (product name: Redige Mixer M20, manufactured by Matsubo Corporation), the resulting mixture was pre-molded in a molding press (manufactured by Oji Kikaikogyo, K. K.), the thus obtained preform was subjected to hot press molding for 6 minutes using a molding press (manufactured by Sanki Seiko Co., Ltd.) under conditions including a molding temperature of 145° C. and a molding pressure of 40 MPa, and the resulting molded item was then heat treated for 4.5 hours at 200° C., ground using a rotary grinder, and then subjected to a scorch treatment at 500° C., thus forming a disc brake pad.

Example 2

A friction material composition was prepared by blending together 5.5% by weight relative to the total weight of the friction material composition of a biosoluble ceramic fiber (B) having an average fiber length of 625 μm as the long fiber (product name: SW607MAX-D, manufactured by Shinnikka Thermal Ceramics Corporation, containing no alumina component, quantity of shot with a particle size of at least 45 μm: 17% by weight of the long ceramic fiber), 1.8% by weight relative to the total weight of the friction material composition of a biosoluble ceramic fiber (D) having an average fiber length of 118 μm as the short fiber (product name: SM90-SAB-T40, manufactured by Shinnikka Thermal Ceramics Corporation, containing no alumina component, and containing no shot with a particle size of at least 45 μm), and the materials shown in Table 2 (quantities within the friction material composition: long ceramic fiber: 5.5% by weight, short ceramic fiber: 1.8% by weight, shot with a particle size of at least 45 μm: 0.9% by weight).

Using this friction material composition, a disc brake pad was prepared in the same manner as the example 1.

Example 3

A friction material composition was prepared by blending together 1.4% by weight relative to the total weight of the friction material composition of a biosoluble ceramic fiber (B) having an average fiber length of 625 μm as the long fiber (product name: SW607MAX-D, manufactured by Shinnikka Thermal Ceramics Corporation, containing no alumina component, quantity of shot with a particle size of at least 45 μm: 17% by weight of the long ceramic fiber), 5.9% by weight relative to the total weight of the friction material composition of a biosoluble ceramic fiber (G) having an average fiber length of 50 μm as the short fiber (product name: Fineflex-E Bulk Fiber T, manufactured by Nichias Corporation, quantity of alumina component: 2% by weight of the short ceramic fiber, quantity of shot with a particle size of at least 45 μm: 9% by weight of the short ceramic fiber), and the materials shown in Table 2 (quantities within the friction material composition: long ceramic fiber: 1.4% by weight, short ceramic fiber: 5.9% by weight, shot with a particle size of at least 45 μm: 0.8% by weight).

Using this friction material composition, a disc brake pad was prepared in the same manner as the example 1.

Example 4

A friction material composition was prepared by blending together 2.2% by weight relative to the total weight of the friction material composition of a biosoluble ceramic fiber (B) having an average fiber length of 625 μm as the long fiber (product name: SW607MAX-D, manufactured by Shinnikka Thermal Ceramics Corporation, containing no alumina component, quantity of shot with a particle size of at least 45 μm: 17% by weight of the long ceramic fiber), 5.1% by weight relative to the total weight of the friction material composition of a biosoluble ceramic fiber (F) having an average fiber length of 100 μm as the short fiber (product name: Fineflex-E Bulk Fiber T, manufactured by Nichias Corporation, quantity of alumina component: 2% by weight of the short ceramic fiber, quantity of shot with a particle size of at least 45 μm: 1% by weight of the short ceramic fiber), and the materials shown in Table 2 (quantities within the friction material composition: long ceramic fiber: 2.2% by weight, short ceramic fiber: 5.1% by weight, shot with a particle size of at least 45 μm: 0.4% by weight).

Using this friction material composition, a disc brake pad was prepared in the same manner as the example 1.

Example 5

A friction material composition was prepared by blending together 2.2% by weight relative to the total weight of the friction material composition of a biosoluble ceramic fiber (B) having an average fiber length of 625 μm as the long fiber (product name: SW607MAX-D, manufactured by Shinnikka Thermal Ceramics Corporation, containing no alumina component, quantity of shot with a particle size of at least 45 μm:

17% by weight of the long ceramic fiber), 5.1% by weight relative to the total weight of the friction material composition of a biosoluble ceramic fiber (H) having an average fiber length of 50 µm as the short fiber (product name: Fineflex-E Bulk Fiber T, manufactured by Nichias Corporation, quantity of alumina component: 2% by weight of the short ceramic fiber, quantity of shot with a particle size of at least 45 µm: 1% by weight of the short ceramic fiber), and the materials shown in Table 2 (quantities within the friction material composition: long ceramic fiber: 2.2% by weight, short ceramic fiber: 5.1% by weight, shot with a particle size of at least 45 µm: 0.4% by weight).

Using this friction material composition, a disc brake pad was prepared in the same manner as the example 1.

Example 6

A friction material composition was prepared by blending together 1.4% by weight relative to the total weight of the friction material composition of a biosoluble ceramic fiber (B) having an average fiber length of 625 µm as the long fiber (product name: SW607MAX-D, manufactured by Shinnikka Thermal Ceramics Corporation, containing no alumina component, quantity of shot with a particle size of at least 45 µm: 17% by weight of the long ceramic fiber), 5.9% by weight relative to the total weight of the friction material composition of a biosoluble ceramic fiber (D) having an average fiber length of 118 µm as the short fiber (product name: SM90-SAB-T40, manufactured by Shinnikka Thermal Ceramics Corporation, containing no alumina component, and containing no shot with a particle size of at least 45 µm), and the materials shown in Table 2 (quantities within the friction material composition: long ceramic fiber: 1.4% by weight, short ceramic fiber: 5.9% by weight, shot with a particle size of at least 45 µm: 0.2% by weight).

Using this friction material composition, a disc brake pad was prepared in the same manner as the example 1.

For comparative purposes, friction materials were also prepared using either a bioinsoluble ceramic fiber, or only one type of biosoluble ceramic fiber.

Comparative Example 1

A friction material composition was prepared by blending together 7.3% by weight relative to the total weight of the friction material composition of a bioinsoluble ceramic fiber (A) having an average fiber length of 600 µm (product name: Fiberfrax®-Z Engineered Fiber ZFC600/90, manufactured by Toshiba Monofrax Co., Ltd., chemical composition: $Al_2O_3$: $SiO_2$: $ZrO_2$=30:53:16, quantity of shot with a particle size of at least 45 µm: 14% by weight of the ceramic fiber), and the materials shown in Table 2 (quantities within the friction material composition: ceramic fiber: 7.3% by weight, shot with a particle size of at least 45 µm: 1.0% by weight).

Using this friction material composition, a disc brake pad was prepared in the same manner as the example 1.

Comparative Example 2

A friction material composition was prepared by blending together 7.3% by weight relative to the total weight of the friction material composition of a biosoluble ceramic fiber (B) having an average fiber length of 625 µm (product name: SW607MAX-D, manufactured by Shinnikka Thermal Ceramics Corporation, containing no alumina component, quantity of shot with a particle size of at least 45 µm: 17% by weight of the ceramic fiber), and the materials shown in Table 2 (quantities within the friction material composition: ceramic fiber: 7.3% by weight, shot with a particle size of at least 45 µm: 1.2% by weight).

Using this friction material composition, a disc brake pad was prepared in the same manner as the example 1.

Comparative Example 3

A friction material composition was prepared by blending together 7.3% by weight relative to the total weight of the friction material composition of a biosoluble ceramic fiber (C) having an average fiber length of 285 µm (product name: SM90-SAZ-P15, manufactured by Shinnikka Thermal Ceramics Corporation, containing no alumina component, quantity of shot with a particle size of at least 45 µm: 3% by weight of the ceramic fiber), and the materials shown in Table 2 (quantities within the friction material composition: ceramic fiber: 7.3% by weight, shot with a particle size of at least 45 µm: 0.2% by weight).

Using this friction material composition, a disc brake pad was prepared in the same manner as the example 1.

Comparative Example 4

A friction material composition was prepared by blending together 7.3% by weight relative to the total weight of the friction material composition of a biosoluble ceramic fiber (D) having an average fiber length of 118 µm (product name: SM90-SAZ-T40, manufactured by Shinnikka Thermal Ceramics Corporation, containing no alumina component, and containing no shot with a particle size of at least 45 µm), and the materials shown in Table 2 (quantities within the friction material composition: ceramic fiber: 7.3% by weight, shot with a particle size of at least 45 µm: none).

Using this friction material composition, a disc brake pad was prepared in the same manner as the example 1.

Comparative Example 5

A friction material composition was prepared by blending together 7.3% by weight relative to the total weight of the friction material composition of a biosoluble ceramic fiber (E) having an average fiber length of 100 µm (product name: Fineflex-E Bulk Fiber T, manufactured by Nichias Corporation, quantity of alumina component: 2% by weight of the short ceramic fiber, quantity of shot with a particle size of at least 45 µm: 9% by weight of the ceramic fiber), and the materials shown in Table 2 (quantities within the friction material composition: ceramic fiber: 7.3% by weight, shot with a particle size of at least 45 µm: 0.7% by weight).

Using this friction material composition, a disc brake pad was prepared in the same manner as the example 1.

Derusting Test for Friction Materials of Present Invention

Tests were conducted to evaluate the derusting properties relative to the opposing material for the friction materials of the examples 1 to 6 and the comparative examples 1 to 5.

Test Method

All evaluations were conducted by testing the moment of inertia using a Forrester vehicle manufactured by Fuji Heavy Industries Ltd. The rotors used in testing were disc rotors (FC250) manufactured by Kiriu Corporation.

Following completion of a wear procedure with a dynamometer in accordance with JASO C427 (initial speed: 50 km/h, deceleration: 0.3 G, brake temperature prior to braking: 100° C., braking repetitions: 200), the disc rotor was subjected to a rusting procedure. This rusting procedure was conducted by spraying the disc rotor with salt water in accordance with JIS Z2371, by placing the rotor inside a salt water spray tester for one hour, subsequently drying the disc rotor for one hour at 100° C., storing the disc rotor for 10 hours inside a constant temperature, high humidity chamber held at a temperature of 50±1° C. and a humidity of 95%±1% in accordance with the constant temperature, high humidity test of JIS D4419, and then leaving the disc rotor to stand for 24 hours in the atmosphere at room temperature. This series of rust-imparting steps was performed three times, thereby causing rusting of the disc rotor.

Intentionally rusted rotors prepared in the manner described above were braked using the friction materials of the examples 1 to 6 and the comparative examples 1 to 5, under the wear conditions described in JASO C427 (initial speed: 50 km/h, deceleration: 0.3 G, brake temperature prior to braking: 100° C.), and the derusting property of each friction material was determined by evaluating the derusting rate after 10 braking repetitions and 500 braking repetitions, using the criteria shown below.

⊚: 90% or greater
○: 80% or greater
Δ: 60% or greater
X: less than 60%

Derusting rate=thickness of rust removed/initial rust thickness after rusting×100(%)

Rust thickness after rusting=disc rotor thickness after rusting−disc rotor thickness after wear Rust thickness after derusting test=disc rotor thickness after braking (10 repetitions or 500 repetitions)−disc rotor thickness after wear Thickness of rust removed=rust thickness after rusting−rust thickness after derusting test The derusting properties for the friction materials determined using the above test are shown in Table 1.

TABLE 1

Results of Evaluating Derusting Properties of Friction Materials

|  |  | Examples | | | | | | Comparative examples | | | | |
|---|---|---|---|---|---|---|---|---|---|---|---|---|
|  |  | 1 | 2 | 3 | 4 | 5 | 6 | 1 | 2 | 3 | 4 | 5 |
| Quantity of ceramic fiber (wt %) | A* | — | — | — | — | — | — | 7.3 | — | — | — | — |
|  | B | 1.4 | 5.5 | 1.4 | 2.2 | 2.2 | 1.4 | — | 7.3 | — | — | — |
|  | C | — | — | — | — | — | — | — | — | 7.3 | — | — |
|  | D | — | 1.8 | — | — | — | 5.9 | — | — | — | 7.3 | — |
|  | E | 5.9 | — | — | — | — | — | — | — | — | — | 7.3 |
|  | F | — | — | — | 5.1 | — | — | — | — | — | — | — |
|  | G | — | — | 5.9 | — | — | — | — | — | — | — | — |
|  | H | — | — | — | — | 5.1 | — | — | — | — | — | — |
| Quantity of shot of at least 45 μm within friction material (wt %) |  | 0.8 | 0.9 | 0.8 | 0.4 | 0.4 | 0.2 | 1.0 | 1.2 | 0.2 | 0 | 0.7 |
| Presence of alumina component within short fiber |  | Yes | No | Yes | Yes | Yes | No | — | No | No | No | Yes |
| Combination of ceramic fibers of different lengths |  | Yes | Yes | Yes | Yes | Yes | Yes | No | No | No | No | No |
| Derusting property | 10 braking repetitions | ⊚ | Δ | ○ | ○ | ○ | Δ | ○ | Δ | X | X | X |
|  | 500 braking repetitions | ⊚ | ⊚ | ⊚ | ⊚ | ⊚ | ○ | ⊚ | Δ | Δ | Δ | Δ |

*Bioinsoluble ceramic fiber

TABLE 2

Blend Materials other than Biosoluble Ceramic Fiber

|  | Base material name | Manufacturer | Product name | Blend quantity* |
|---|---|---|---|---|
| Organic fiber | Aramid fiber | DuPont Toray Co., Ltd. | 1F538 | 3.0 |
| Metal fiber | Copper fiber | NihonSteelWool Co., Ltd. | CCW208 | 12.0 |
| Binder | Phenolic resin | Mitsui Chemicals, Inc. | RN2830MR | 8.0 |
| Organic filler | Cashew dust | Tohoku Chemical Industries, Ltd. | FF1056 | 6.0 |
| Inorganic filler | Potassium titanate | Kubota Corporation | TXAX-MA | 10.0 |
| Inorganic filler | Barium sulfate | Guangong Metal Corporation | Barite powder | 25.0 |
| Inorganic filler | Mica | Kuraray Co., Ltd. | 80SF | 2.0 |
| Inorganic filler | Graphite | Nippon Graphite Industries, Ltd. | PAG80 | 3.0 |
| Inorganic filler | Tin sulfide | Daiichi Kigenso Kagaku Kogyo Co., Ltd. | Stanolube | 3.0 |
| Inorganic filler | Zirconia silicate | Daiichi Kigenso Kagaku Kogyo Co., Ltd. | MZ1000B | 4.0 |
| Inorganic filler | Zirconium oxide | Daiichi Kigenso Kagaku Kogyo Co., Ltd. | BRQZ | 14.0 |
| Inorganic filler | Calcium hydroxide | Chichibu Lime Industry Co., Ltd. | SA149 | 2.7 |

*Blend quantity: % by weight relative to the total weight of the friction material composition From these results it is evident that friction materials prepared using a friction material composition comprising two biosoluble ceramic fibers of different fiber lengths exhibit excellent derusting properties at the opposing disc rotor, and these properties are similar to the derusting performance of bioinsoluble ceramic fibers. Furthermore, friction materials in which the short fiber comprises alumina exhibit particularly superior derusting performance, and friction materials comprising shot also exhibit superior derusting performance. Moreover, the products of this invention also exhibit less environmental impact than friction material compositions that use conventional bioinsoluble ceramic fibers, and are less injurious to human health.

The invention claimed is:

1. A composition for a friction material, comprising a fibrous substrate, a binder and a filler, wherein the fibrous substrate comprises at least two types of biosoluble ceramic fibers having different fiber lengths.

2. The composition for a friction material according to claim 1, wherein the two types of biosoluble ceramic fibers having different fiber lengths comprise a biosoluble ceramic fiber shorter than 200 μm, and a biosoluble ceramic fiber longer than 400 μm.

3. The composition for a friction material according to claim 1, comprising from 1 to 3% by weight of a biosoluble ceramic fiber having a fiber length of at least 400 μm, and from 4 to 10% by weight of a biosoluble ceramic fiber having a fiber length of 50 to 200 μm.

4. The composition for a friction material according to claim 2, wherein the biosoluble ceramic fiber having a fiber length shorter than 200 μm comprises an alumina component.

5. The composition for a friction material according to claim 1, further comprising at least 0.2% by weight of a particulate material with a particle diameter of at least 45 μm.

6. A friction material, produced by hot press molding of the composition for a friction material according to claim 1.

7. A friction material, produced by hot press molding of the composition for a friction material according to claim 5.

8. The composition for a friction material according to claim 1, which excludes asbestos and bioinsoluble ceramic fibers.

9. The composition for a friction material according to claim 1, wherein said biosoluble ceramic fibers are selected from the group consisting of $SiO_2$—$CaO$—$MgO$ fibers and $MgO$—$Al_2O_3$ fibers.

10. The composition for a friction material according to claim 5, containing 0.2 to 3.0% by weight of the particulate material.

11. The composition for a friction material according to claim 2, wherein the two types of biosoluble ceramic fibers include a biosoluble ceramic fiber with a fiber length in the range of 50 to 200 μm and a biosoluble ceramic fiber with a fiber length of 400 to 700 μm.

12. The composition for a friction material according to claim 2, wherein said binder is a thermosetting resin.

13. The composition for a friction material according to claim 12, wherein said thermosetting resin is at least one selected from the group consisting of phenolic resins, acrylic-modified phenolic resins and silicone-modified phenolic resins.

* * * * *